(12) United States Patent
Hiraguchi et al.

(10) Patent No.: US 7,004,418 B2
(45) Date of Patent: Feb. 28, 2006

(54) RECORDING TAPE CARTRIDGE

(75) Inventors: Kazuo Hiraguchi, Kanagawa (JP); Wataru Iino, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/270,172

(22) Filed: Oct. 15, 2002

(65) Prior Publication Data

US 2003/0071158 A1 Apr. 17, 2003

(30) Foreign Application Priority Data

Oct. 15, 2001 (JP) ........................................ 2001-317086

(51) Int. Cl.
*G11B 23/107* (2006.01)

(52) U.S. Cl. ..................................... 242/348.2; 360/132
(58) Field of Classification Search ................. 242/348, 242/348.2; 360/132
See application file for complete search history.

(56) References Cited

U.S. PATENT DOCUMENTS

| 4,045,821 | A |   | 8/1977  | Fujikura |         |
|-----------|---|---|---------|----------|---------|
| 4,383,660 | A |   | 5/1983  | Richard et al. |   |
| 4,426,047 | A |   | 1/1984  | Richard et al. |   |
| 5,570,252 | A |   | 10/1996 | Sumner et al. |    |
| 5,868,333 | A |   | 2/1999  | Nayak |            |
| 6,034,839 | A |   | 3/2000  | Hamming |          |
| 6,236,539 | B1 | * | 5/2001 | Morita et al. ............... 360/132 |
| 6,349,892 | B1 |   | 2/2002 | Morita et al. |    |
| 6,581,865 | B1 |   | 6/2003 | Zweighaft et al. | |
| 6,742,738 | B1 |   | 6/2004 | Hiraguchi |        |
| 2003/0071157 | A1 | * | 4/2003 | Hiraguchi et al. ....... 242/348.2 |
| 2003/0071158 | A1 |   | 4/2003 | Hiraguchi et al. | |
| 2003/0071159 | A1 |   | 4/2003 | Hiraguchi et al. | |
| 2003/0080228 | A1 |   | 5/2003 | Hiraguchi et al. | |
| 2003/0094525 | A1 |   | 5/2003 | Hiraguchi |       |
| 2003/0094528 | A1 |   | 5/2003 | Hiraguchi |       |
| 2003/0094530 | A1 |   | 5/2003 | Hiraguchi |       |
| 2003/0094531 | A1 |   | 5/2003 | Hiraguchi |       |
| 2003/0094532 | A1 |   | 5/2003 | Hiraguchi |       |
| 2003/0106953 | A1 | * | 6/2003 | Hiraguchi et al. ....... 242/348.2 |
| 2003/0178519 | A1 | * | 9/2003 | Hancock et al. ............ 242/348 |

FOREIGN PATENT DOCUMENTS

| JP | 63-53633    | 1/1994  |
| JP | 9-039832    | 2/1997  |
| JP | 11-213615   | 8/1999  |
| JP | 11-297032   | 10/1999 |
| JP | 2000-243056 | 9/2000  |
| JP | 2000-331403 | 11/2000 |
| JP | 2001-148181 | 5/2001  |
| JP | 2001-273740 | 10/2001 |

* cited by examiner

*Primary Examiner*—John Q. Nguyen
(74) *Attorney, Agent, or Firm*—Sughrue Mion, PLLC

(57) ABSTRACT

The present invention provides A recording tape cartridge including: a rectangular case having, at a corner portion, an opening for pulling-out of one end of a recording tape, and accommodating the recording tape; a cover member opening and closing the opening; and an opening opening/closing mechanism holding the cover member at the case, and selectively moving the cover member between a position of opening the opening and a position of closing the opening.

23 Claims, 15 Drawing Sheets

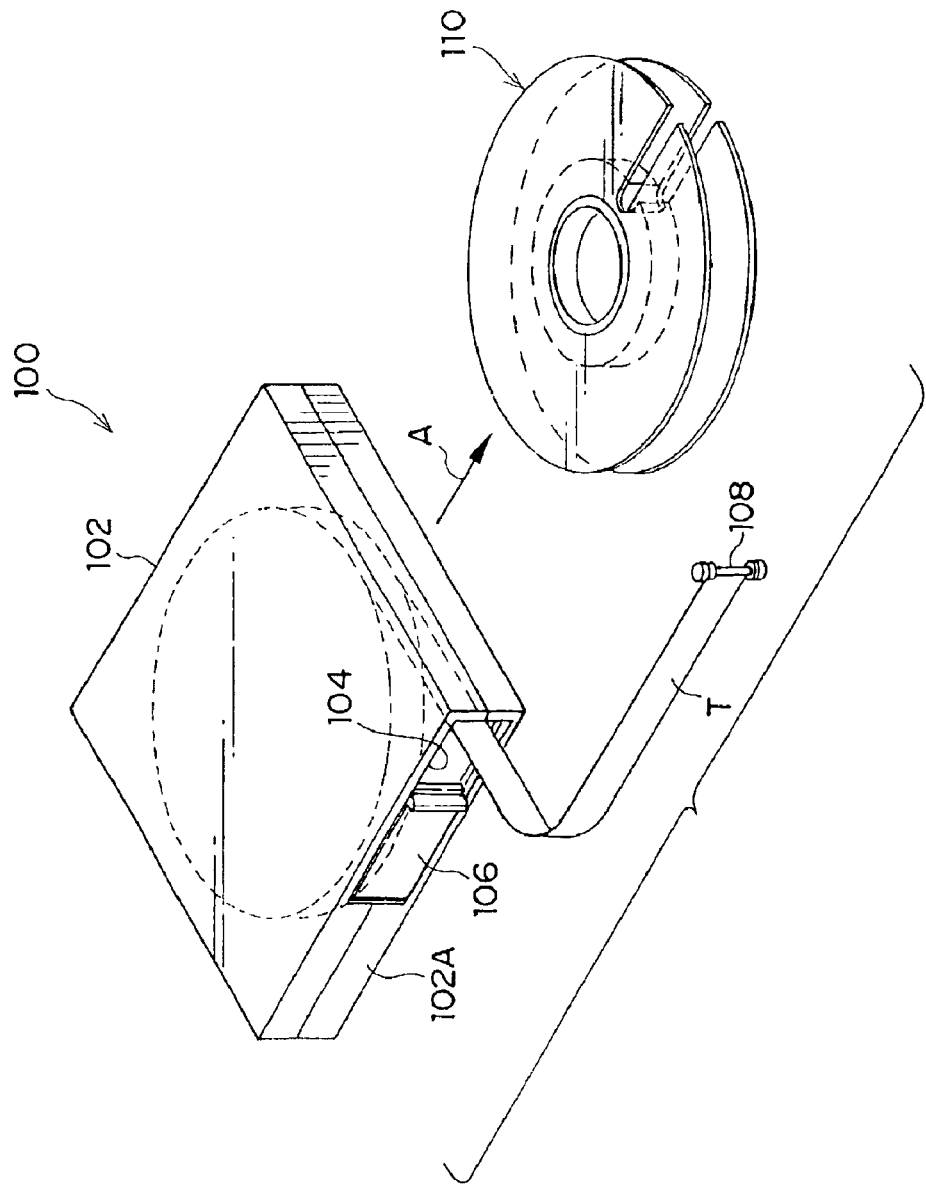

RECORDING TAPE CARTRIDGE

BACKGROUND OF THE INVENTION

1. Field of the Invention

The present invention relates to a recording tape cartridge which rotatably accommodates a single reel on which is wound a recording tape such as a magnetic tape or the like.

2. Description of the Related Art

Recording tapes, such as magnetic tapes or the like, are used as external recording media for computers and the like. A recording tape cartridge, which requires little space for storage, and in which a large amount of information can be recorded, and which accommodates a single reel on which the recording tape is wound, is used for the recording tape.

An opening is formed in a case of the recording tape cartridge. The recording tape is pulled out from the opening, and is taken-up onto a take-up reel of a drive device. Conventionally, various measures have been devised in order for dust and the like to not enter in from the opening and adhere to the recording tape.

In a recording tape cartridge 100 shown in FIG. 13, an opening 104 is formed in a side wall 102A (a side wall running along a case loading direction A) of a case 102. The opening 104 is opened and closed by a door 106 which slides along the loading direction.

However, at the position of the opening 104, an operation member of the drive device, which pulls-out a leader member (i.e., a leader pin 108) which is attached to an end portion of a magnetic tape T which is the recording tape, must move around from the lateral direction of the case 102 and pull-out the leader pin 108. Thus, space for the operation member to move around (i.e., move non-rectilinearly) must be ensured in the drive device. Moreover, the mechanism for moving the operation member around becomes complex, and the drive device becomes large. In addition, the path along which the magnetic tape T is pulled out becomes long with respect to a take-up reel 110.

In a recording tape cartridge 112 shown in FIG. 14, an opening 116 is formed in a front wall 114A (a front wall facing the case loading direction A) of a case 114. The opening 116 is opened and closed by a pivoting-type door 118 which opens and closes around a shaft.

In this recording tape cartridge 112, because the opening 116 is formed at the front wall 114A, there is no need for the operation member of the drive device to pull-out the magnetic tape T by moving around from the lateral direction. However, because the door 118 outwardly opens widely, space must be ensured in the drive device such that nothing interferes with the opening and closing operations of the door 118. Therefore, the drive device becomes large.

In a recording tape cartridge 120 shown in FIG. 15, an opening 124 is formed by cutting off a corner portion of a case 122. The opening 124 is opened and closed directly by a leader block 126 which is a leader member connected to the end portion of the magnetic tape T.

If the leader block 126 only functions as a door for closing the opening 124, no problems arise even if scratches are formed in or dust adheres to the leader block 126. However, the leader block 126 is pulled out by an operation member of the drive device, and is fit-together with a hub 130 of a take-up reel 128 of the drive device. Thus, if scratches are formed in or dirt adheres to the leader block 126, the leader block 126 cannot fit-together well with the hub 130, and there is the concern that the conveying of the magnetic tape T may be adversely affected. Moreover, because the leader block 126 forms a portion of a take-up surface which takes-up the magnetic tape T, there is the risk that the data recorded on the magnetic tape T will be damaged or that regions which cannot be recorded will arise due to scratches formed in or dirt adhering to the leader block 126.

Further, the leader block 126 is merely anchored at the edge of the opening 126. Thus, there is the concern that, if the case 122 is dropped, the leader block 126 will come apart from the opening 124. Moreover, because the leader block 126 is larger than a leader pin, the number of constraints on the configuration of the case 122 increases.

SUMMARY OF THE INVENTION

In view of the aforementioned, an object of the present invention is to provide a recording tape cartridge having an opening which enables an operating mechanism of a drive device to pull-out a recording tape along the shortest path, and in which a door for closing the opening and a leader member for the pulling-out of the recording tape are formed as separate members, and which enables a drive device to have a compact design.

A first aspect of the invention is a recording tape cartridge comprising: a rectangular case having, at a corner portion, an opening for pulling-out of one end of a recording tape, and accommodating the recording tape; a cover member opening and closing the opening; and an opening opening/closing mechanism holding the cover member at the case, and selectively moving the cover member between a position of opening the opening and a position of closing the opening.

In the above-described structure, when the recording tape cartridge is to be used, the recording tape cartridge is loaded into a drive device. The leader member is pulled-out from the opening by the operating mechanism, and the recording tape is pulled-out from the case. The leader member is accommodated at the hub of the drive device as the recording tape is being pulled-out. In this state, the hub is driven to rotate, and the recording tape is successively pulled-out from the case while being taken-up onto the outer peripheral surface of the hub. Information is recorded on or played back from the recording tape by a recording/playback head or the like disposed along a predetermined tape path.

Here, the opening is formed by cutting off a corner portion of the rectangular case in the direction of loading the case into a drive device. Therefore, the plane of opening of the opening is directed in the direction of loading the case into the drive device and in a direction orthogonal to the direction of loading and to the thickness direction of the case. Namely, the operation mechanism can access the leader member from the loading direction side, from the direction orthogonal to the loading direction and to the thickness direction of the case, or from the direction of the corner portion.

Thus, it is possible to design a drive device in which the path for the pulling-out of the recording tape is the shortest, and there is no need for a drive mechanism in which the operation mechanism moves around and chucks the leader member. Thus, a compact and inexpensive drive device can be designed. Simultaneously, the entire path along which the magnetic tape travels also becomes shorter as a matter of course, and thus, the wear due to contact between the magnetic tape and a tape guide can be reduced.

Further, due to the operating mechanism of the drive device operating the opening opening/closing mechanism, the cover member is moved between a position of closing the opening and a position of opening the opening, and the opening is closed or opened. Namely, the opening is closed and opened by the cover member which is provided as a member separate from the leader member. Thus, it is difficult for the leader member to be scratched or become dirtied. Therefore, the pulling-out of the recording tape and the conveying of the recording tape within the drive device are not affected.

Even if the case is dropped, because the cover member is held at the case by the opening opening/closing mechanism, the cover member does not come apart from the case, and dust and the like do not inadvertently enter in from the opening. Note that "cover member" is a comprehensive term encompassing members which can close the opening, such as a door, a lid, a shutter, and the like.

As one example of the opening opening/closing mechanism, the opening opening/closing mechanism can operate the cover member to open and close in the minimum space by sliding the cover member so as to open or close the opening. The drive device can thereby be made compact.

Further, the cover member may be disposed at the inner side of the opening, and when opening or closing the opening, may move along a locus which is defined such that the cover member does not jut out further than the region defined by the outer configuration of the case. In this way, it is difficult for a user to intentionally open and close the cover member.

BRIEF DESCRIPTION OF THE DRAWINGS

FIG. 13 is a perspective view showing the overall structure of a conventional recording tape cartridge.

DESCRIPTION OF THE PREFERRED EMBODIMENTS

A recording tape cartridge 10 relating to an embodiment of the present invention will now be described. Note that, for convenience of explanation, the direction of loading the recording tape cartridge 10 into a drive device is denoted by arrow A, and a direction orthogonal to the direction of arrow A is denoted by arrow B.

Figure 1:
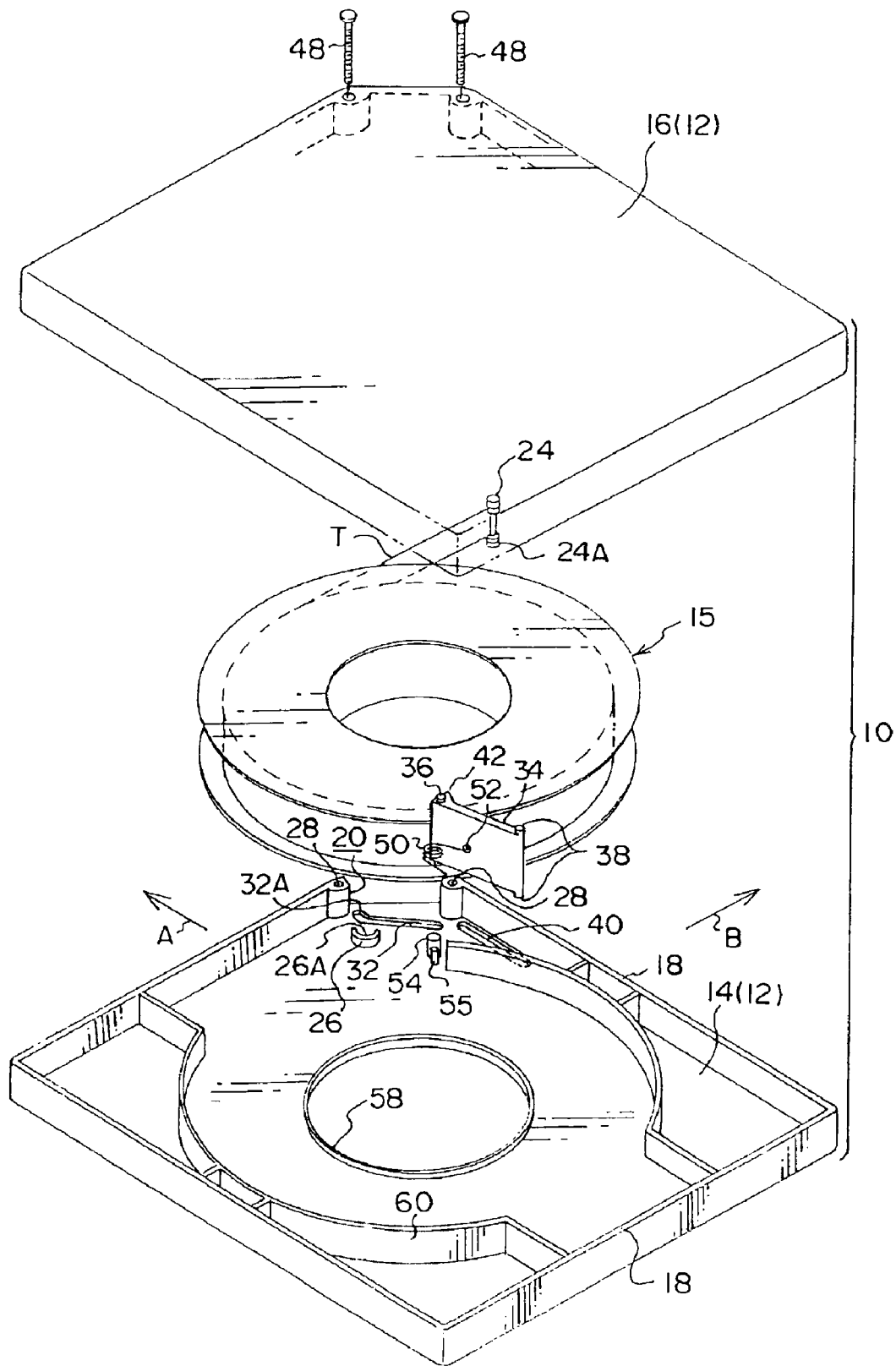
FIG. 1 is an exploded perspective view showing the overall structure of a recording tape cartridge relating to an embodiment of the present invention.

As shown in FIG. 1, at the recording tape cartridge 10, a single reel 15, on which is wound a magnetic tape T serving as a recording tape which is an information recording/playback medium, is rotatably accommodated within a case 12 which is substantially rectangular as seen in plan view.

The case 12 is formed by superposing together a pair of cells 14, 16 at each of which a loading direction corner portion has been cut off. An accommodating space for the magnetic tape T is formed at the interior of the case 12. The cut-off corner portions of peripheral walls 18 of the cells 14, 16 form an opening 20 for the pulling-out of the magnetic tape T.

In this way, by forming the opening 20 at the corner portion of the case 12, the plane of opening of the opening 20 is directed in direction A and in direction B. Therefore, a chucking mechanism 22 (see FIG. 4) can access and chuck a leader pin 24 from direction A, or from direction B, or from between direction A and direction B.

The area over which the pin stands 26, which hold the leader pin 24, can be set, can thereby be broadened. Namely, because the region over which the chucking mechanism 22 can chuck the leader pin 24 is wide, the position at which the pin stands 26 are to be set can be determined in accordance with the specifications of the drive device which is chucking from the direction of arrow A or from the direction of arrow B. Therefore, the degrees of freedom in designing the drive device can be increased.

Screw bosses 28 are formed at the edges of the opening 20, i.e., at the final end portions of the peripheral wall 18 of the cell 14. Screws 48 are screwed in and fixed into the screw bosses 28 from the upper side cell 16. In this way, even if the case 12 is dropped, the opening 20, which is disadvantageous in terms of strength, does not deform or buckle and the position thereof does not shift, due to the weight of the entire recording tape cartridge 10.

Figure 2:
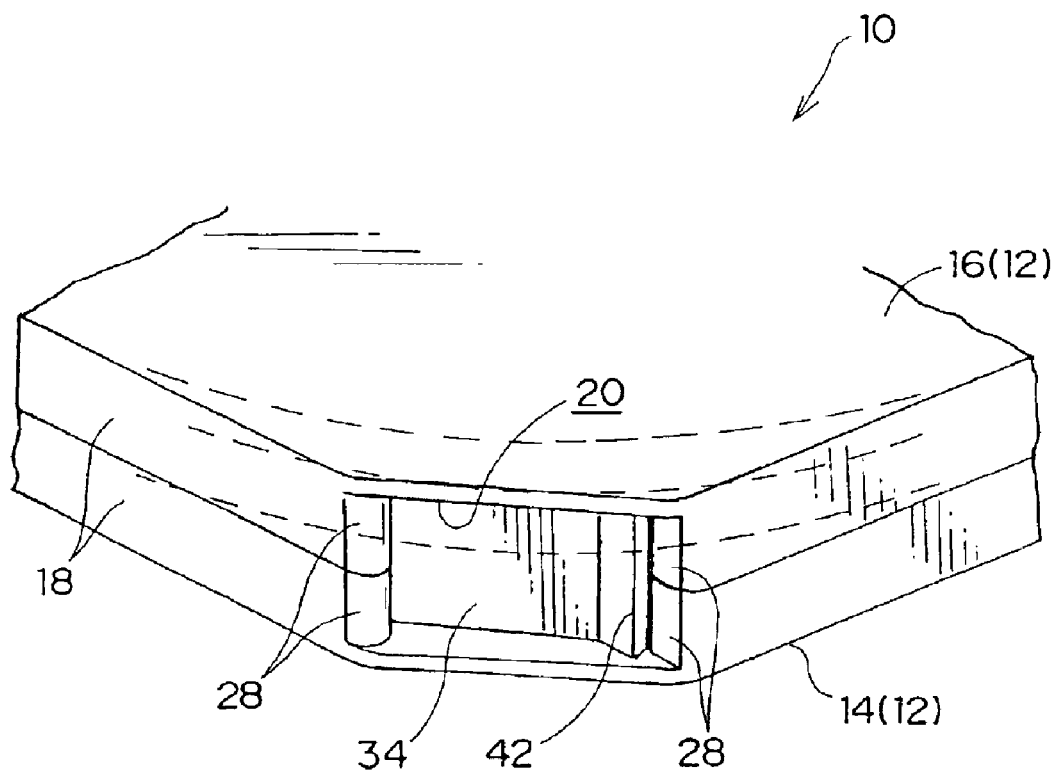
FIG. 2 is a perspective view showing the relationship between an opening and a door of the recording tape cartridge relating to the embodiment of the present invention.
Figure 3:
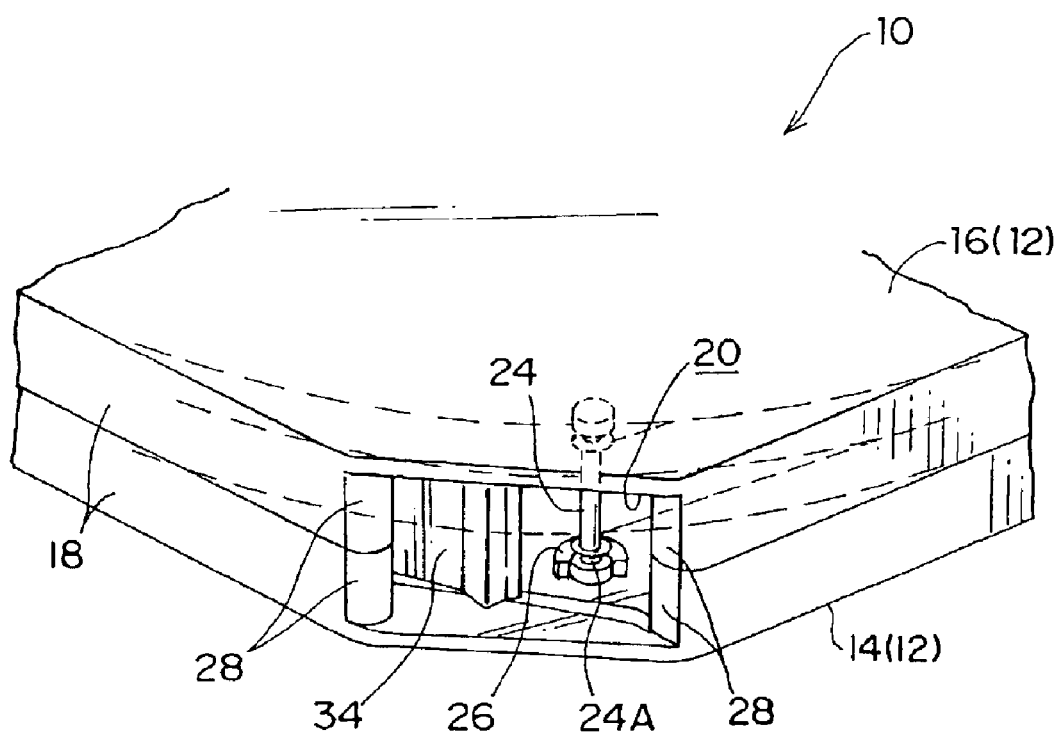
FIG. 3 is a perspective view showing the relationship between the opening and the door of the recording tape cartridge relating to the embodiment of the present invention.

In the same way as at the cell 14, the peripheral wall 18 and the screw bosses 28 (see FIG. 2) are formed at the cell 16. Note that, in order to avoid repetitive description, description will be given hereinafter by using the cell 14 as an example, but it is to be understood that the cell 16 has a similar structure.

The diameter of the thread of the screw 48 is, for example, φ2.0 mm, and the outer diameter of the screw boss 28 is φ4.0 mm. Further, instead of screws, projections may be made to project from the cell 16 at positions corresponding to the screw bosses 28, and fit-together holes which fit together with these projections may be provided at the cell 14, and the projections and fit-together holes may be fit-together. However, in this case, it is preferable that the cell 16 and the cell 14 be fastened together by screws at places within a radius of 30 mm from these regions of fitting-together. Moreover, the surfaces of the peripheral walls 18 of the cells 14 and 16 which oppose one another may be fixed by welding.

At the area where the pin stands 26 are set (i.e., in a vicinity of the opening), the plate thickness of each of the upper cell 16 and the lower cell 14 is 2 mm, which is thicker than the other areas. Moreover, the cells are formed from a polycarbonate (PC) material.

This is in order to improve the strength in vicinities of the pin stands 26 which are the holding (positioning) positions of the leader pin 24 which is most important in the functions of the recording tape cartridge 10 (i.e., which should be correctly anchored by the chucking mechanism 22 at the time when the magnetic tape T is to be pulled-out), and is in order to prevent positional offset from arising due to the impact caused by dropping or the like.

The pin stands 26 are formed in the shapes of semicircular tubes, and the end portions of the leader pin 24 which stands erect are held in recess portions 26A of the pin stands 26. The sides of the outer peripheral walls of the pin stands 26, at which sides the magnetic tape T is pulled-out, are open, and form entrances/exits for the leader pin 24 to enter therein and exit therefrom.

Annular grooves 24A are formed at both end portions of the leader pin 24. The annular grooves 24A are anchored by hooks 30 of a chucking mechanism 22. Further, the annular grooves 24A are positioned at the outer sides of the transverse direction end portions of the magnetic tape T, such that the hooks 30 of the chucking mechanism 22 do not contact and scratch the magnetic tape T.

Second guide grooves 32, which are inclined at a predetermined angle with respect to the plane of opening of the opening 20, are formed in vicinities of the pin stands 26. The second guide grooves 32 are formed such that, when the inner surfaces of the upper cell 16 and the lower cell 14 are brought face-to-face to each other, the second guide grooves 32 are at the same positions. Guide pins 36, which project in the transverse direction from one end side of a rectangular door 34 which opens and closes the opening 20, are slidably inserted into the second guide grooves 32.

The plate width (the height) of the door 34 and the opening height of the opening 20 are substantially the same, and the plate length of the door 34 is longer than the opening width of the opening 20. Namely, the slidability of the door 34 is maintained, and the door 34 blocks dust and the like from entering in from the opening 20.

Guide pins 38 project in the transverse direction from the other end side of the door 34. The guide pins 38 are inserted into first guide grooves 40 which are formed parallel to the peripheral walls 18 which run along direction A. The first guide grooves 40 also are formed such that, when the inner surfaces of the upper cell 16 and the lower cell 14 are brought face-to-face to each other, the first guide grooves 40 are at the same positions.

Figure 5:
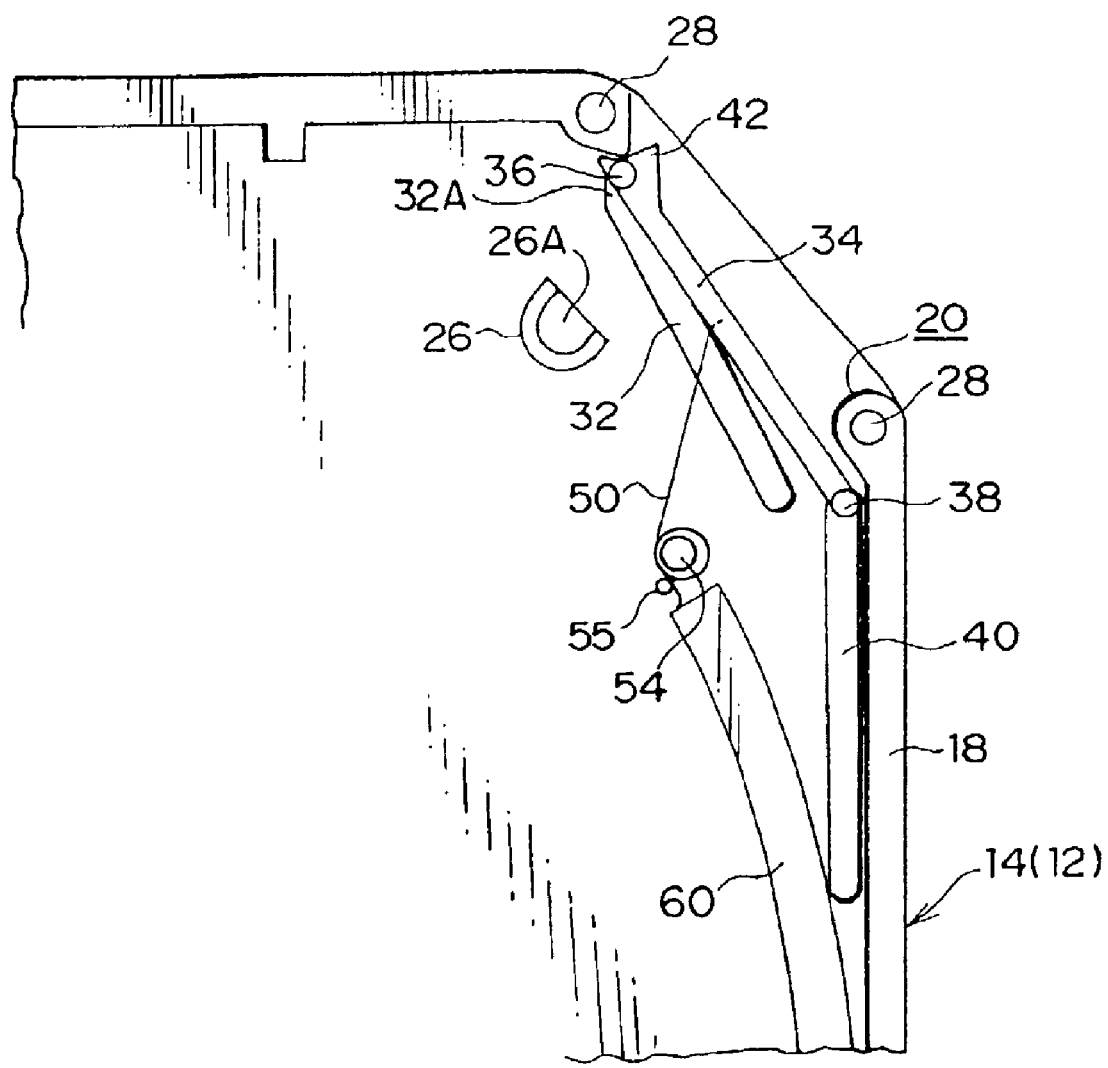
FIG. 5 is a plan view showing the operation of opening and closing the door of the recording tape cartridge relating to the embodiment of the present invention.
Figure 6:
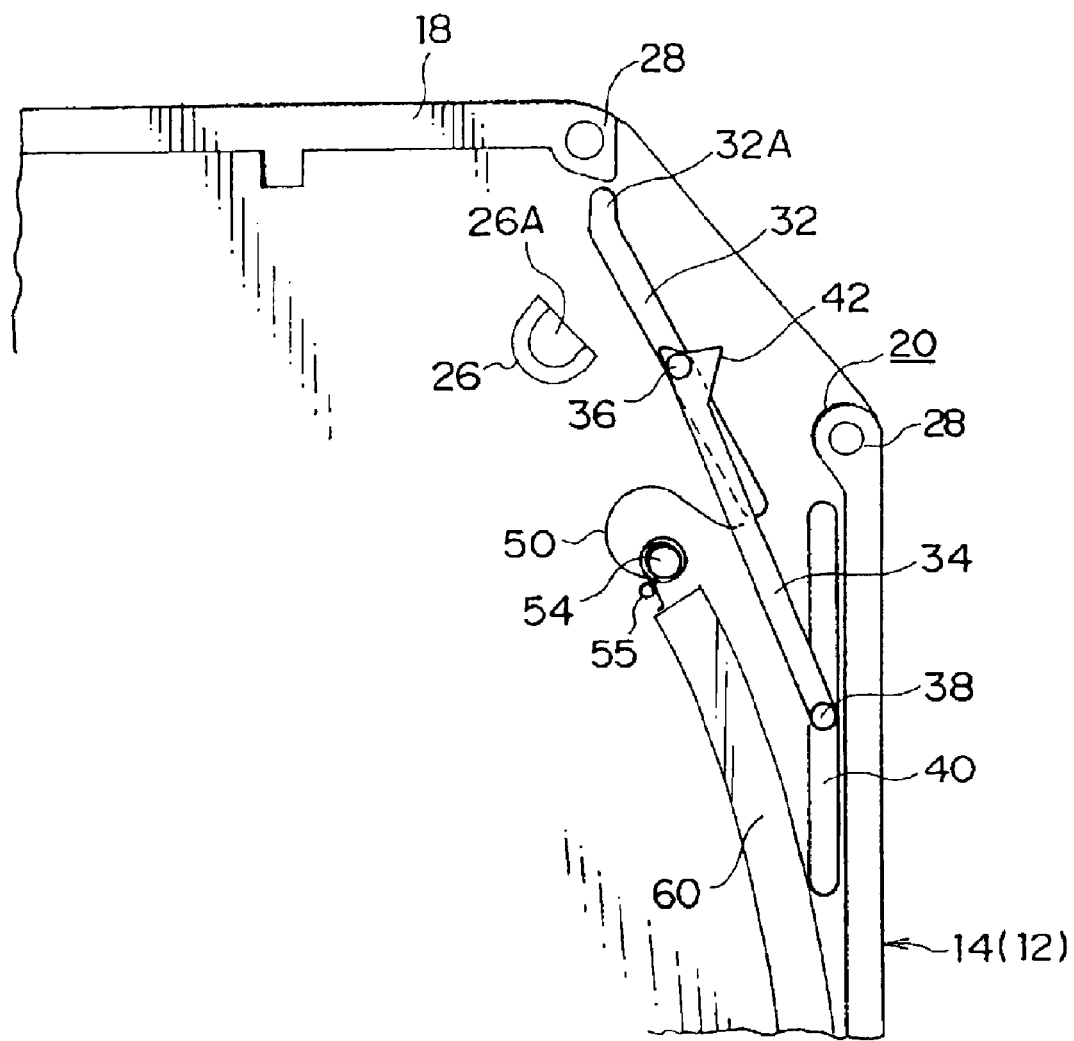
FIG. 6 is a plan view showing the operation of opening and closing the door of the recording tape cartridge relating to the embodiment of the present invention.
Figure 7:
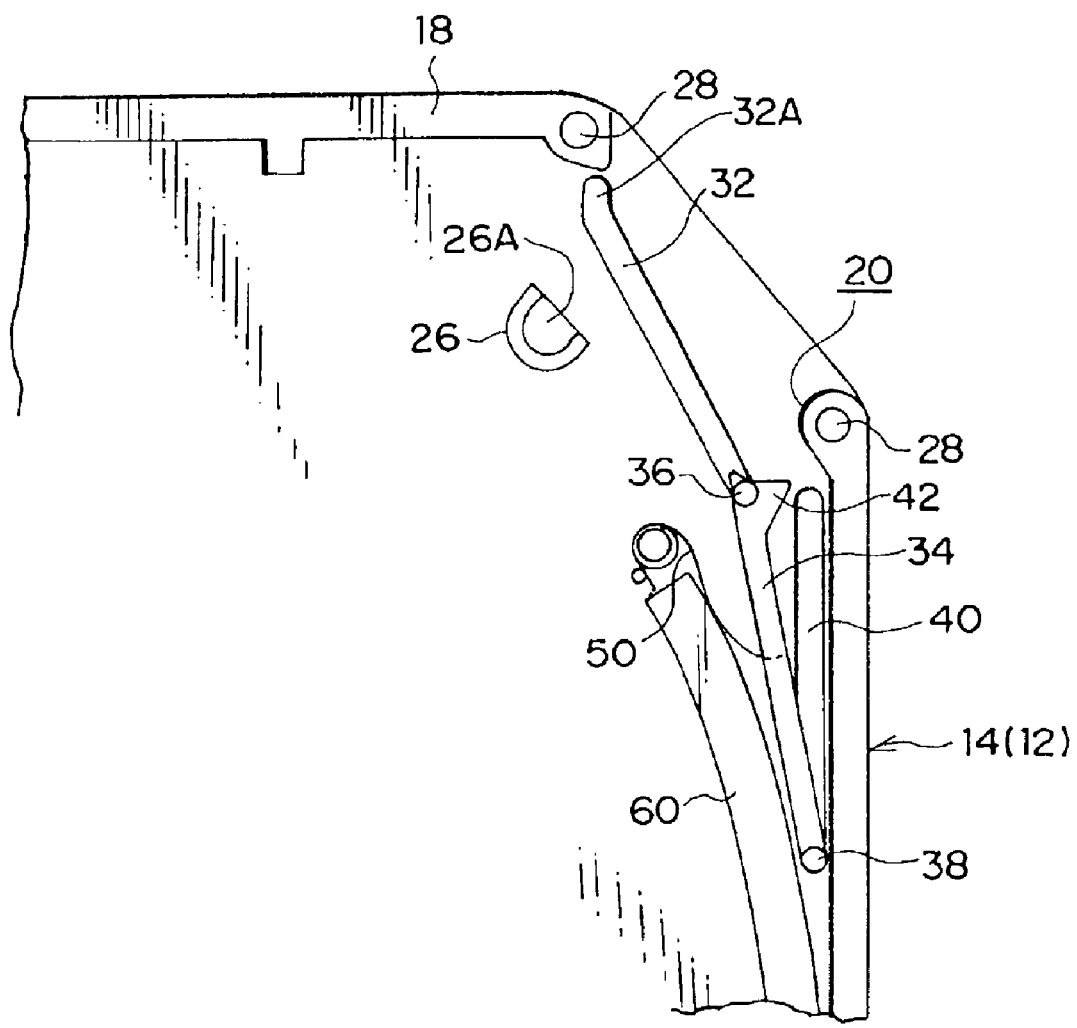
FIG. 7 is a plan view showing the operation of opening and closing the door of the recording tape cartridge relating to the embodiment of the present invention.

The guide pins 38 are inserted into the first guide grooves 40, the guide pins 36 are inserted into the second guide grooves 32, and the door 34 is disposed so as to span between the second guide grooves 32 and the first guide grooves 40. In this way, as shown in FIGS. 5 through 7, while pivoting, with the guide pins 38 serving as the axis of pivoting, the door 34 slides at the inner side of the peripheral walls 18 so as to open the opening 20. Further, at the time of closing the opening 20, conversely, the door 34 is slid so as to be pushed toward the opening 20, and is set substantially parallel to the plane of opening of the opening 20 so as to close the opening 20.

Moreover, bent portions 32A, which are bent outwardly, are formed at the front ends (the end portions at the side in the loading direction A) of the second guide grooves 32. The bent portions 32A are parallel to the first guide grooves 40. Accordingly, as shown in FIG. 5, when the guide pins 38 are positioned at the front ends (the opening side end portions) of the first guide grooves 40 and the guide pins 36 are positioned in the bent portions 32A and the door 34 is closing the opening 20, even if a user pushes the door 34 in the direction of opening the door 34, the guide pins 36 catch on the bent portions 32A, and the door 34 cannot be easily opened.

Note that, in the present embodiment, the bent portions 32A are formed along the direction of arrow A. However, the angle of inclination of the bent portions 32A with respect to the longitudinal direction of the second guide grooves 32 can be set to an arbitrary value between 50° and 150°, and the bent portions 32A can also be formed so as to bend in a curved shape.

A triangular rib 42 extends along the transverse direction at the outer surface of the one end side of the door 34. The rib 42 anchors on a picking portion 46 of a door opening/closing arm 44 provided at a drive device which will be described later, such that, when the case 12 is inserted into the drive device, sliding force along the bent portions 32A is applied to the door 34. Thus, the guide pins 36 move away from the bent portions 32A and move along the second guide grooves 32, and the door 34 is opened.

Further, an anchor hole 52, at which one end of a torsion spring 50 is anchored, is formed in the central portion of the door 34. A cylindrical supporting column 54 is inserted into the coil portion of the torsion spring 50 which is anchored on the anchor hole 52. The other end of the torsion spring 50 is anchored on an anchor pin 55. Force in the closing direction is always applied to the door 34 by the torsion spring 50.

A gear opening 58 for exposing a reel gear to the exterior, is provided in the central portion of the lower cell 14. A reel 15 is driven to rotate within the case 12 by the reel gear meshing with a drive gear of the drive device. The reel 15 is held, such that it does not joggle, by peripheral walls 60 which partially project from the inner surfaces of the cells 14, 16 and which are on a circular locus. Note that the anchor pin 55 is provided at the outer side of the peripheral wall 60 and does not contact the reel 15.

Next, description will be given of the basic structure of the chucking mechanism 22, the door opening/closing arm 44 which opens and closes the door 34, and a take-up reel (not shown) of the drive device into which the recording tape cartridge 10 of the present embodiment is loaded.

Figure 4:
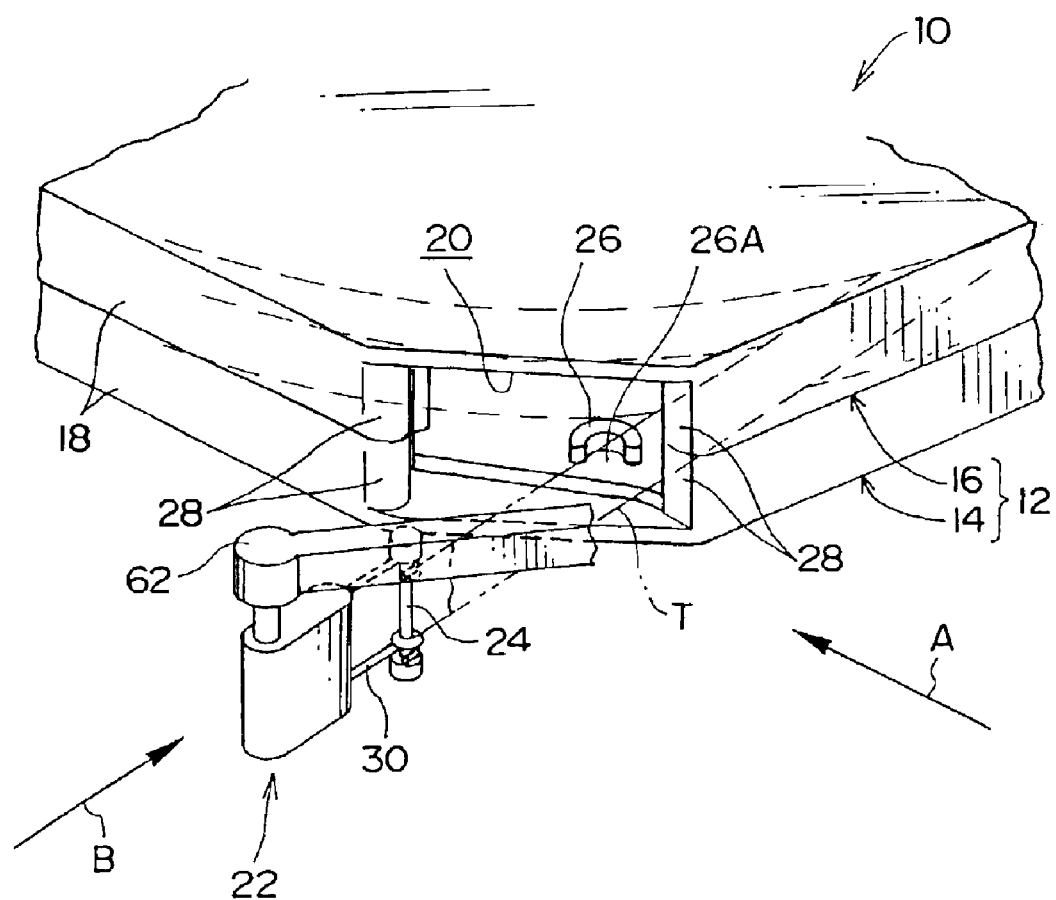
FIG. 4 is a perspective view showing the relationship between the opening and the door of the recording tape cartridge relating to the embodiment of the present invention.

As shown in FIG. 4, the chucking mechanism 22 has the hooks 30 which chuck the leader pin 24, and a pivoting arm 62 which makes the hooks 30 carry out their chucking operation. When the door 34 is opened by the door opening/closing arm 44 and the case 12 is stopped at a predetermined position within the drive device, the pivoting arm 62 pivots, anchors on the leader pin 24 held at the pin stands 26, pulls-out the magnetic tape T from the opening 20, and moves the magnetic tape T to the hub of a take-up reel (not illustrated). An attaching groove, which the leader pin 24 fits into, is formed in the hub. When the pivoting arm 62 makes the leader pin 24 be accommodated in the attaching groove, the hub is rotated, and the magnetic tape T is taken-up onto the reel along a predetermined path.

Next, the door opening/closing arm will be described.

Figure 8:
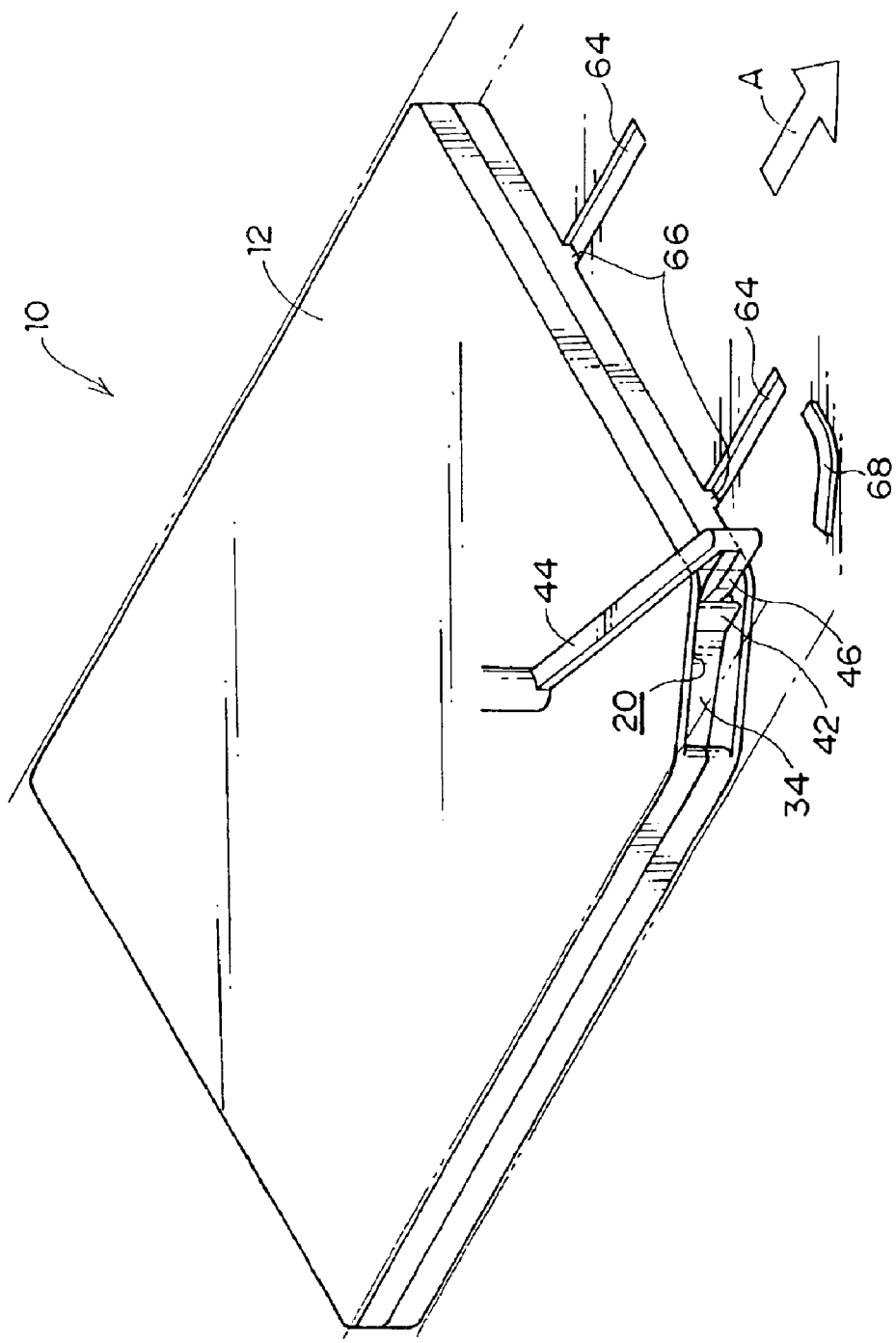
FIG. 8 is a perspective view showing a state in which the door of the recording tape cartridge relating to the embodiment of the present invention is opened by a door opening/closing arm.

As shown in FIG. 8, the door opening/closing arm 44 is pivotably provided above the loading portion of the recording tape cartridge 10. At the position shown in FIG. 9, pivoting of the door opening/closing arm 44 in the counterclockwise direction is restrained, and the door opening/closing arm 44 is positioned. The picking portion 46, which is bent toward the center of pivoting of the door opening/closing arm 44, is formed at the distal end portion of the door opening/closing arm 44. When the recording tape cartridge 10 is loaded into the drive device, the distal end of the picking portion 46 enters into a gap formed between the surfaces of the rib 42 of the door 34 and the screw boss 28, which surfaces face one another.

Guide grooves 64 are formed along the loading direction in the base surface of the loading portion of the recording tape cartridge 10. Ribs 66 formed at the case 12 engage with the guide grooves 64, such that the recording tape cartridge 10 can be loaded into the drive device without tending to the left or the right. Moreover, a stopper 68 stands erect at the far back side of the base surface. The stopper 68 is formed in a configuration which follows along the shape of the corner portion of the case 12, and functions as a member for positioning the case 12 in the horizontal direction.

The opening 20 of the case 12 is formed by cutting-off a loading direction corner portion. Therefore, merely by changing the cut-off shape of the corner portion, the corner portion can be made to function also as a portion for identifying the recording tape cartridge in a recording tape cartridge library (which is equipped with a plurality of shelves in which recording tape cartridges are stocked, and which has the functions of removing a recording tape cartridge in accordance with a request therefor and loading the recording tape cartridge into a drive device). In this way, there is no need to form a separate identifying portion at the case. Therefore, it is possible to prevent the structure of a metal mold for the case from becoming complex, and to prevent the strength of the case from being insufficient and the dust-proof ability of the case from deteriorating.

Next, operation of the present embodiment will be described.

Figure 9:
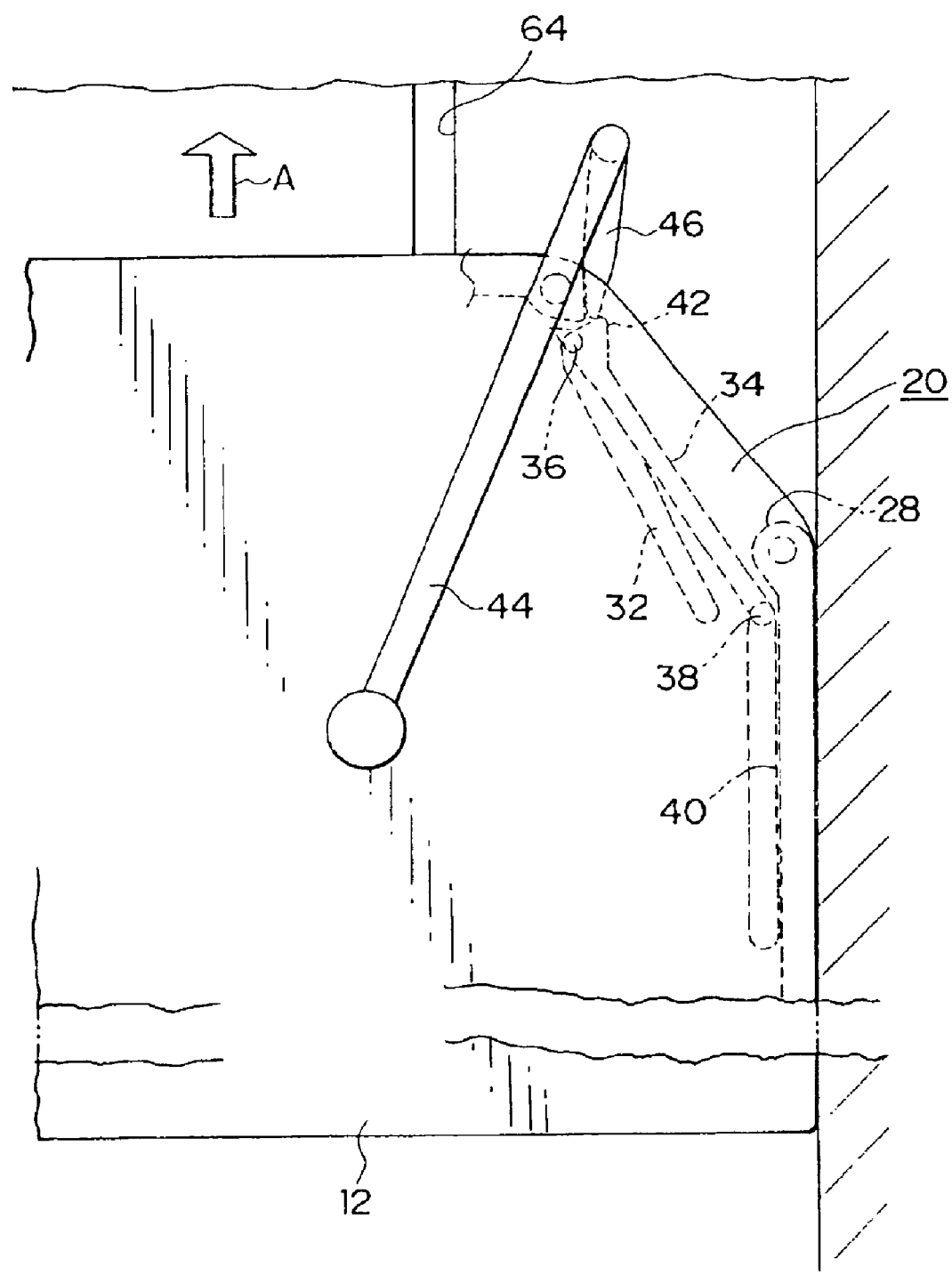
FIG. 9 is a plan view showing a state in which the door of the recording tape cartridge relating to the embodiment of the present invention is opened by the door opening/closing arm.

As shown in FIG. 8 and FIG. 9, when the recording tape cartridge 10 is loaded into the drive device along the direction of arrow A, the rib 42 of the door 34 anchors on the picking portion 46 of the door opening/closing arm 44.

Figure 10:
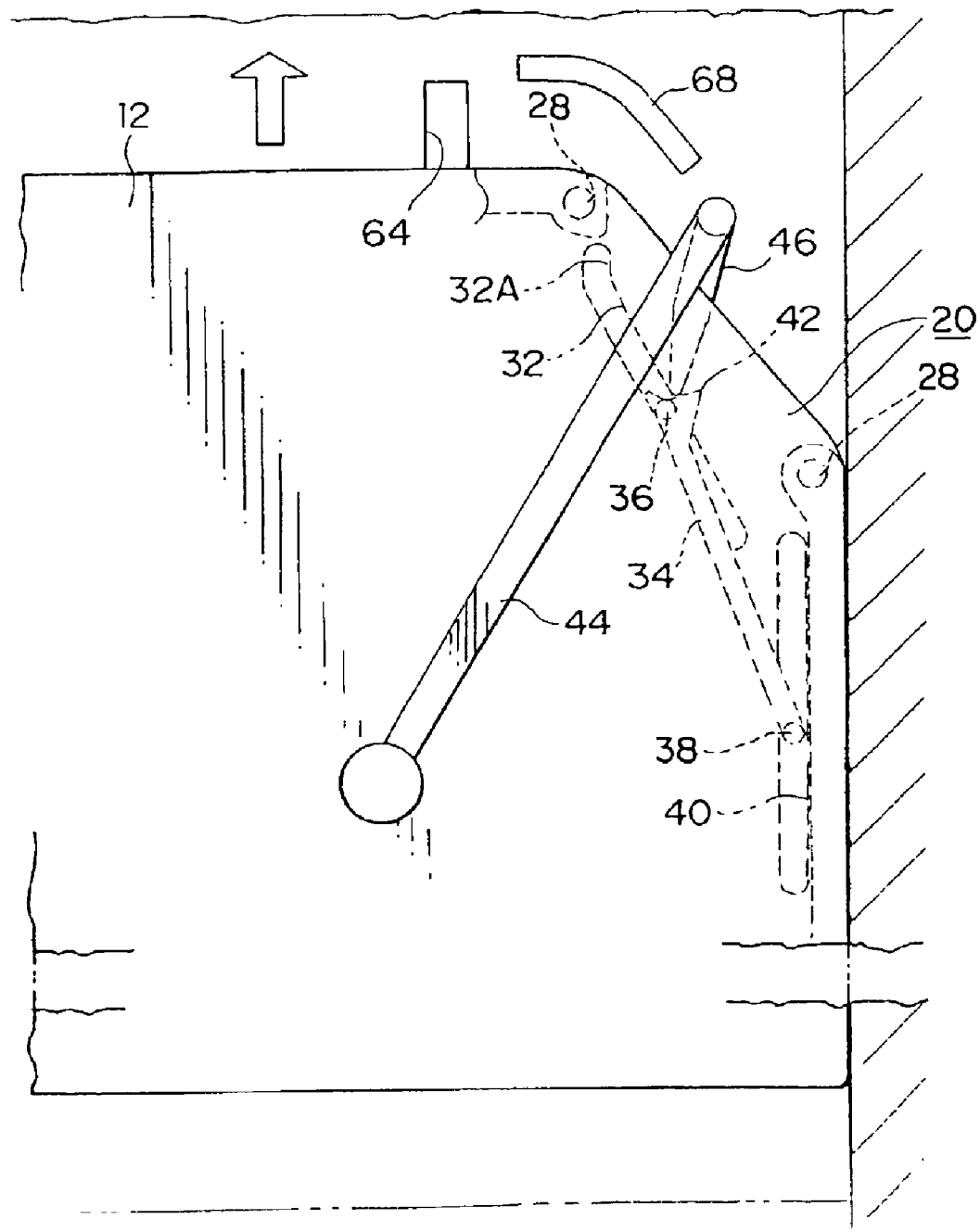
FIG. 10 is a plan view showing the state in which the door of the recording tape cartridge relating to the embodiment of the present invention is opened by the door opening/closing arm.
Figure 11:
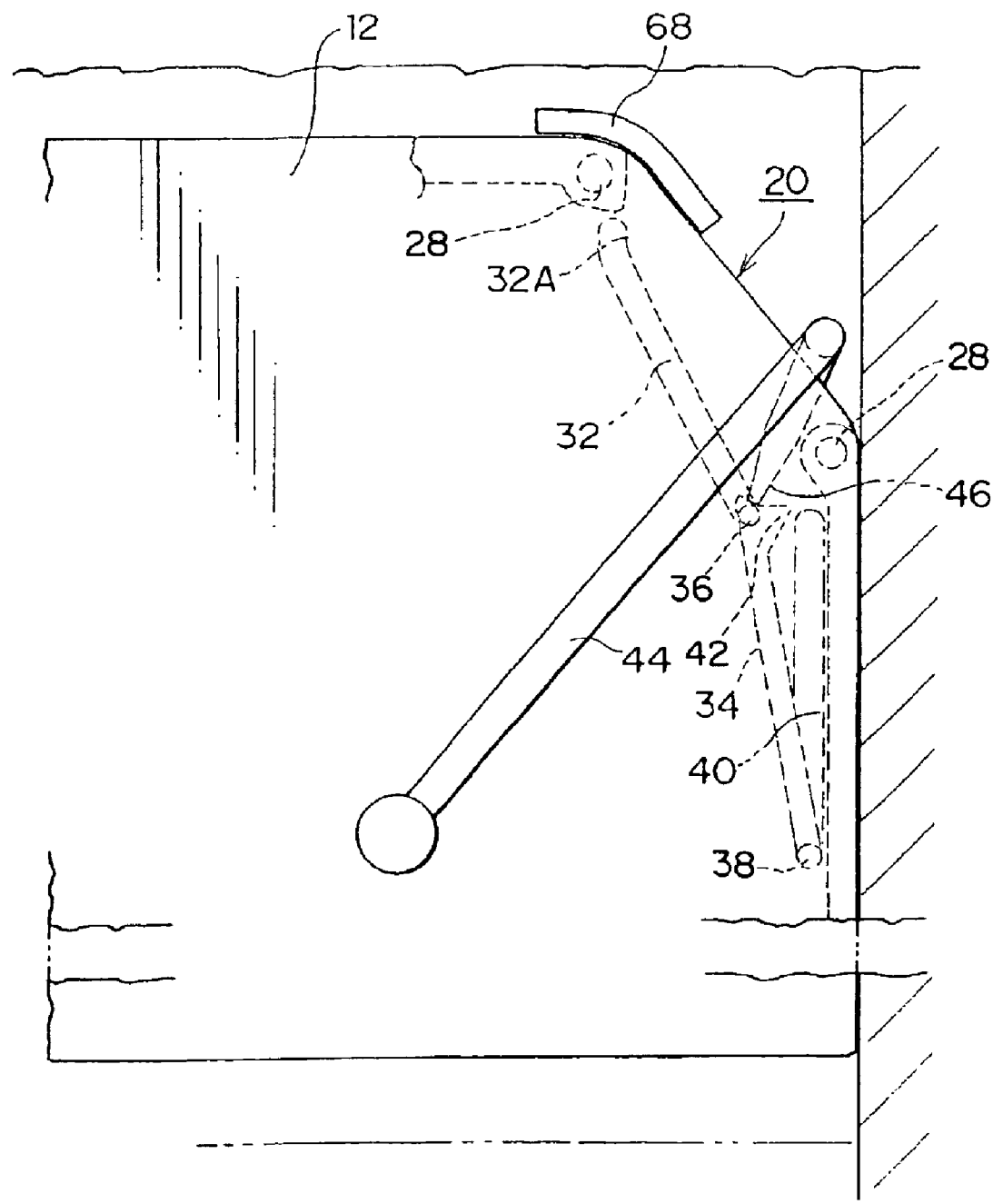
FIG. 11 is a plan view showing the state in which the door of the recording tape cartridge relating to the embodiment of the present invention is opened by the door opening/closing arm.

When the recording tape cartridge 10 is pushed in, as shown in FIG. 10, by utilizing the force of insertion, the door opening/closing arm 44, while pivoting clockwise, slides the door 34 in the direction of opening. Then, as shown in FIG. 11, when the recording tape cartridge 10 is pushed in until the corner portion (the opening portion) of the case 12 abuts the stopper 68, the door 34 slides to the inner side of the case 12 such that the opening 20 is completely opened.

Here, as shown in FIG. 4, the hooks 30 of the chucking mechanism 22 pull-out the leader pin 24 which is held at the pin stands 26, and guide the leader pin 24 to the hub of the reel. Because the hooks 30 can access the leader pin 24 from direction A (the loading direction), the path for pulling-out the magnetic tape T is the shortest, and the entire path along which the magnetic tape T travels becomes shorter as a matter of course. Accordingly, the wear due to contact of the magnetic tape T and a tape guide or the like can be reduced.

Further, because there is no need for a drive mechanism in which the hooks 30 move around and chuck the leader pin 24, it is possible to design a drive device which is compact and has a low manufacturing cost.

Next, when the recording tape cartridge 10 is to be removed, the case is pushed back in the direction opposite to direction A by an unillustrated ejecting mechanism. Thus, the door 34 is pushed in the closing direction by the torsion spring 50. Due to the spring force, the picking portion 46 is pushed by the rib 42 of the door 34, and, as shown in FIG. 10, the door opening/closing arm 44 returns to its original position while pivoting counterclockwise.

In accordance with the above-described operations, the opening 20 is opened and closed, and the leader pin 24 is protected by the door 34 which closes the opening 20. Therefore, it is difficult for the leader pin 24 to be scratched or dirtied. Thus, the pulling-out and the conveying of the magnetic tape within the drive device are not affected.

Further, even if the case 12 is dropped, the door 34 is held in the case 12 by the second guide grooves 32, the first guide grooves 40, and the guide pins 36, 38. Therefore, the door 34 does not come apart from the case 12, and dust and the like do not inadvertently enter in from the opening 20.

Moreover, because the door 34 opens and closes by sliding, the door 34 can be operated to open and close in a minimum amount of space. The drive device can thereby be made compact. Further, the door 34 slides toward the inner side so as to not jut out from the region defined by the outer configuration of the case 12 (the door 34 is positioned further inwardly than the screw bosses at the both sides of the opening). Therefore, it is difficult for a user to intentionally open and close the door 34, and it is difficult for the door 34 to break.

The door may have a configuration which covers the guide grooves when the door is slid, such that dust and the like can be prevented from accumulating in the guide grooves, and the sliding operation of the door is not hindered.

Figure 12A:
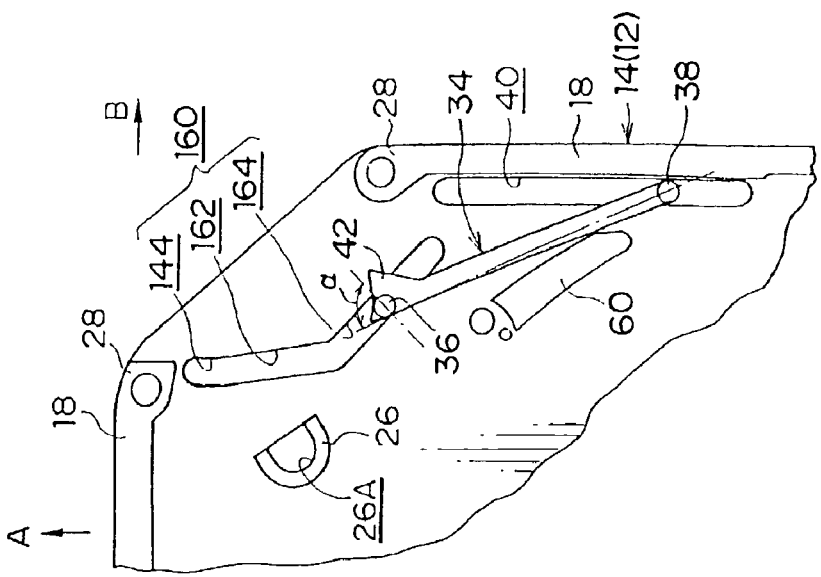
FIG. 12A is a view, as seen with the upper case removed, showing a modified example of a second guide groove which forms the recording tape cartridge relating to the embodiment of the present invention, and is a plan view showing a state in which the opening is closed.
Figure 12B:
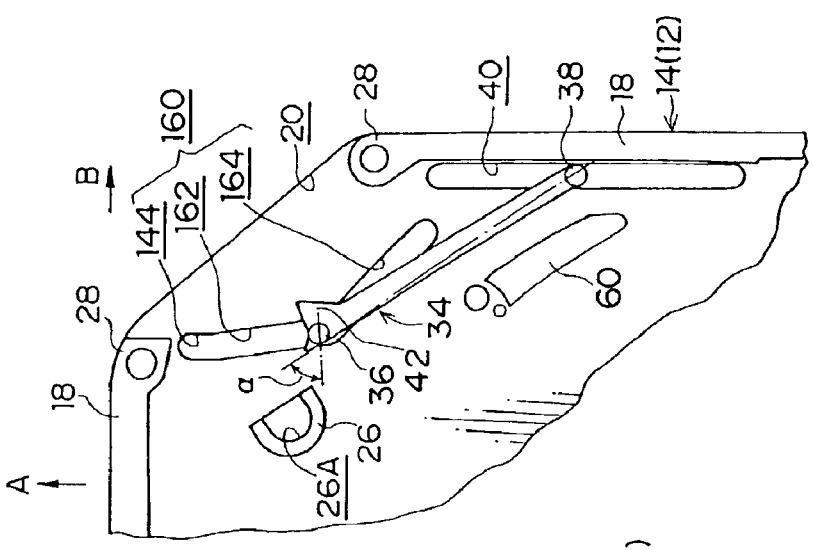
FIG. 12B is a view, as seen with the upper case removed, showing the modified example of the second guide groove which forms the recording tape cartridge relating to the embodiment of the present invention, and is a plan view showing a state in the midst of opening or closing the opening.
Figure 12C:
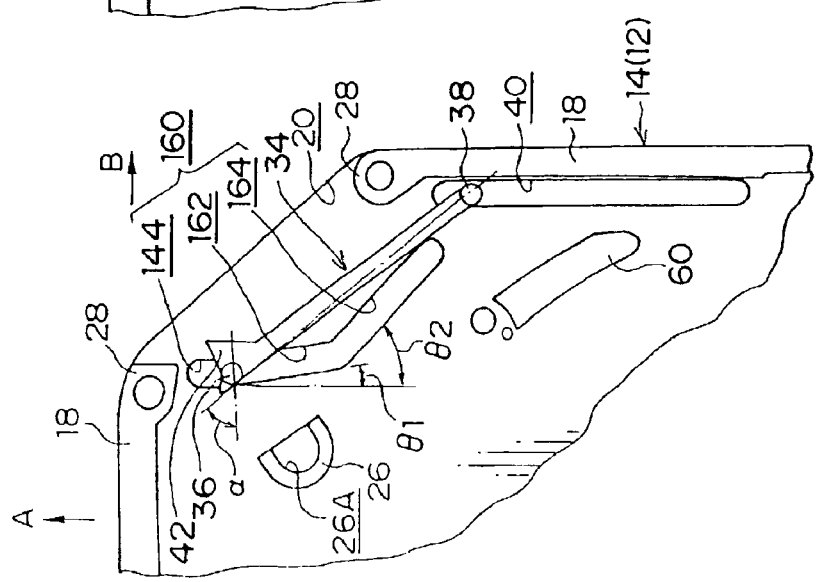
FIG. 12C is a view, as seen with the upper case removed, showing the modified example of the second guide groove which forms the recording tape cartridge relating to the embodiment of the present invention, and is a plan view showing a state in which the opening is opened.
Figure 14:
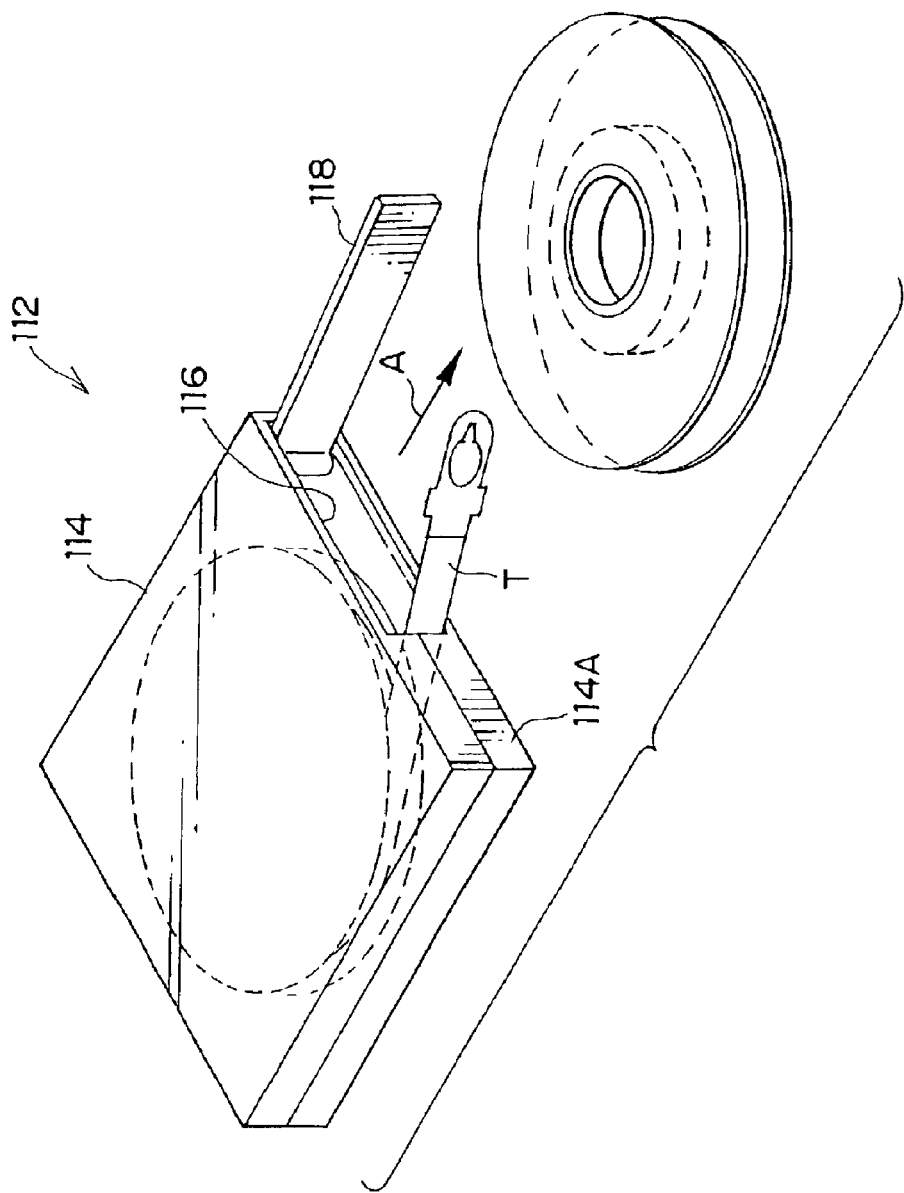
FIG. 14 is a perspective view showing the overall structure of a conventional recording tape cartridge.
Figure 15:
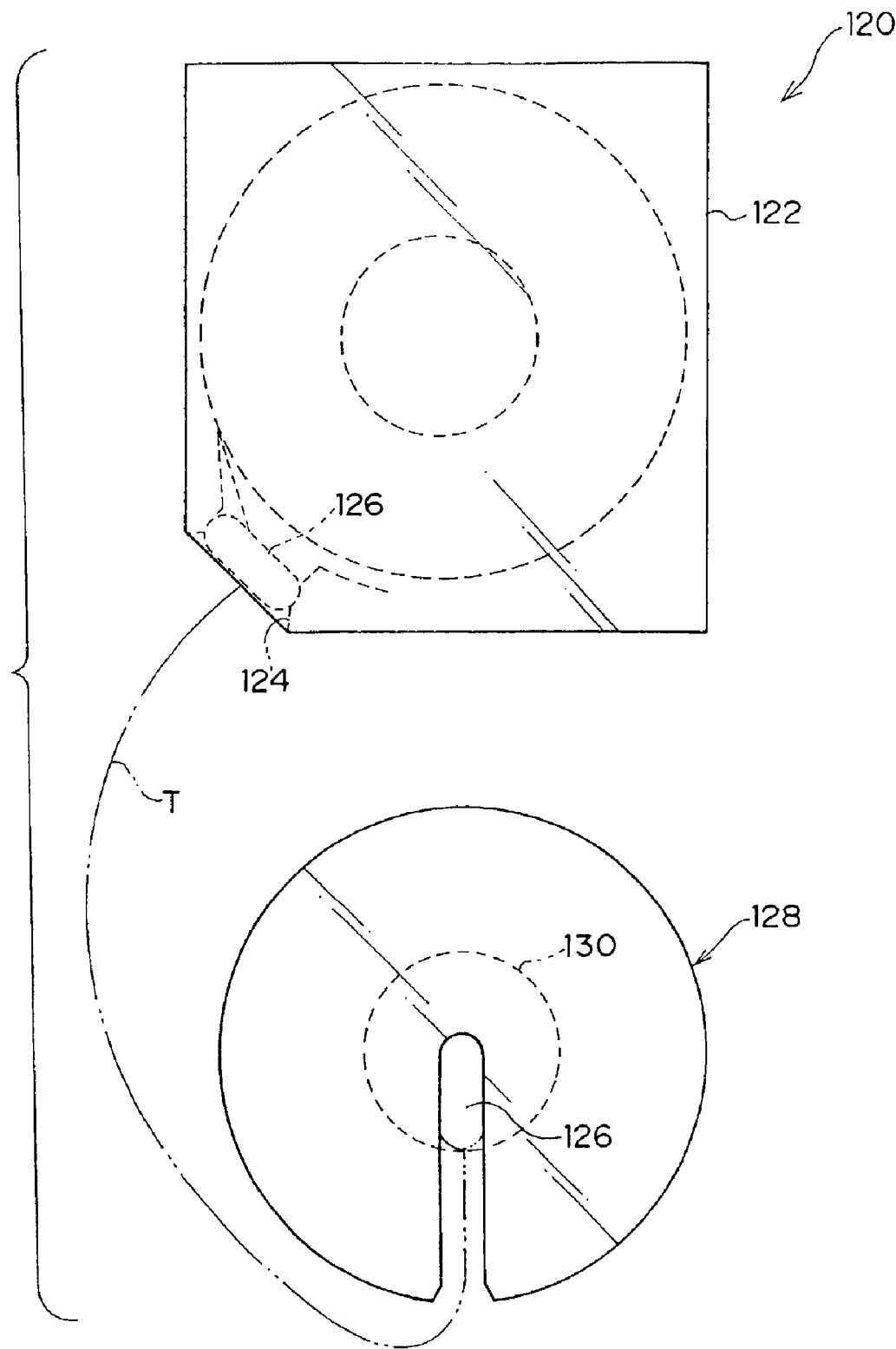
FIG. 15 is a perspective view showing the overall structure of a conventional recording tape cartridge.

In the above-described embodiment, the second guide grooves (cam grooves) 32, which are for regulating rotation of the door 34 around the guide pins 38, are formed to be rectilinear. However, the present invention is not limited to the same. For example, in place of the second guide grooves 32, second guide grooves 160 such as shown in FIGS. 12A, 12B and 12C may be provided. (The torsion spring 50 is not shown in FIGS. 12A, 12B and 12C.)

The second guide groove 160 is formed in a substantial V shape, as seen in plan view, in which an angle of inclination θ1, with respect to the direction of arrow A of a first inclined portion 162 provided at the rear of the bent portion 144, is smaller than an angle of inclination θ2, with respect to the direction of arrow A of a second inclined portion 164 provided at the rear of the first inclined portion 162.

In this structure, the pressure angle of the guide pin 36 with respect to the second guide groove 160 can be made to be smaller than that in the previously-described embodiment. Namely, a pressure angle α is defined as the angle formed by an imaginary line connecting the contact point at which the guide pin 36 abuts the second guide groove 160 and the axial center of the guide pin 38 which is the center of rotation of the guide pin 36, and a normal line of the second guide groove 160 at this contact point. Generally, the pressure angle or is preferably from 15° to 60°. However, in the present embodiment, by keeping the maximum value of the pressure angle α to 55°, the door 34 can be operated even more smoothly.

Note that the both transverse direction groove walls of the second inclined portion 164 of the second guide groove 160 may be formed in circular arc shapes such that the corresponding groove walls of the first inclined portion 162 are lines tangential thereto.

Further, in the above-described embodiment, the first guide groove 40 and the second guide groove 32 (160) are provided independent of one another. However, the present invention is not limited to the same, and the first guide groove 40 and the second guide groove 32 (160) may be formed continuously with one another.

Moreover, in the above-described embodiment, a magnetic tape T is used as the recording tape. However, the present invention is not limited to the same. The recording tape is to be interpreted as being an elongated tape-shaped information recording/playback medium on which information can be recorded and from which recorded information can be played back. The recording tape cartridge relating to the present invention can be applied to recording tapes of any recording/playback system.

Because the present invention has the above-described structure, the operation member of the drive device can pull the recording tape out from the opening of the recording tape cartridge along the shortest path, and the drive device can be designed to be compact. Further, because the door which closes the opening and the leader member for the pulling-out of the recording tape are separate members, it is difficult for the leader member to be scratched. Moreover, because the opening is provided at the corner portion of the recording tape cartridge, the range of positions at which the leader member can be set is broadened, and the degrees of freedom in designing the drive device are increased.

What is claimed is:

1. A recording tape cartridge comprising:
   a rectangular case for accommodating a recording tape having, at a corner portion, an opening for pulling-out of one end of the recording tape;
   a cover member for opening and closing the opening; and
   an opening/closing mechanism holding the cover member at the case, and selectively moving the cover member between a position of opening the opening and a position of closing the opening,
   wherein the rectangular case is provided with an upper cell and a lower cell, and both the upper and lower cells are respectively provided with a first and second guide groove, such that the first and second guide grooves in each of the upper and lower cells comprise the opening/closing mechanism.

2. The recording tape cartridge of claim 1, wherein a leader member is attached to the one end of the recording tape, and the recording tape cartridge further comprises a holding portion holding the leader member within the case, and a region of the case at which the holding portion is provided is thicker than other regions of the case.

3. The recording tape cartridge of claim 1, wherein information recorded on the recording tape is identified by a cut-off configuration of the opening.

4. The recording tape cartridge of claim 1, wherein the opening is formed by cutting off a corner portion of the rectangular case in a direction of loading the rectangular case into a drive device.

5. The recording tape cartridge of claim 4, wherein the opening is formed such that a plane, including the opening, faces the direction of loading the rectangular case into the drive device, and the plane also faces a direction orthogonal to the direction of loading the rectangular case and to a thickness direction of the rectangular case.

6. The recording tape cartridge of claim 1, wherein the cover member has at least one engaging portion at each of one longitudinal direction end portion of the cover member and another longitudinal direction end portion at a side opposite the one longitudinal direction end portion, and the engaging portion of the one longitudinal direction end portion engages with the second guide groove, and the engaging portion of the other longitudinal direction end portion engages with the first guide groove, and the engaging portions are guided in the first guide groove and the second guide groove respectively so that the opening is opened and closed.

7. The recording tape cartridge of claim 6, wherein the at least one engaging portion at each of one longitudinal direction end portion and the longitudinal direction end portion at the side opposite the one longitudinal direction end portion, is a guide pin.

8. The recording tape cartridge of claim 6, wherein the first guide groove is provided substantially parallel to one side wall of the case which side wall is provided continuously with one longitudinal direction end portion of the opening, and the second guide groove is provided in a vicinity of the opening and is inclined at a predetermined angle with respect to a plane including the opening.

9. The recording tape cartridge of claim 8, wherein the second guide groove has a lock mechanism which simply locks the cover member when the opening is closed.

10. The recording tape cartridge of claim 9, wherein the lock mechanism is formed from a bent portion which is formed by one end of the second guide groove being bent.

11. The recording tape cartridge of claim 10, wherein the bent portion is inclined, with respect to a longitudinal direction of the second guide groove, within a range of 15° to 50° toward a direction orthogonal to another side wall of the case with which a longitudinal direction other end portion of the opening is continuous and orthogonal to a direction of thickness of the case.

12. The recording tape cartridge of claim 11, further comprising an urging member urging the cover member in a direction in which the opening is closed.

13. The recording tape cartridge of claim 12, wherein the urging member is a torsion spring.

14. The recording tape cartridge of claim 11, wherein the bent portion is parallel to the first guide groove.

15. The recording tape cartridge of claim 1, wherein the second guide groove has a substantially V-shaped configuration, and is formed from a first inclined portion, which is inclined at an angle θ1 with respect to a direction orthogonal to another side wall of the case with which a longitudinal direction other end portion of the opening is continuous and orthogonal to a direction of thickness of the case, and a second inclined portion, which is inclined at an angle θ2 with respect to said direction.

16. The recording tape cartridge of claim 15, wherein the first guide groove is provided substantially parallel to one side wall of the case with which one longitudinal direction end portion of the opening is continuous.

17. The recording tape cartridge of claim 15, wherein the angle θ2 is greater than the angle θ1.

18. The recording tape cartridge of claim 17, wherein an angle α, which is formed by a normal line of a contact point of the second guide groove and an engaging portion of the cover member which engages with the second guide groove and a line connecting said contact point and a center of an engaging portion which engages with the first guide groove, is within a range of 15° to 60°.

19. The recording tape cartridge of claim 18, wherein a maximum value of the angle α is 55°.

20. The recording tape cartridge of claim 19, wherein the first inclined portion has a lock mechanism which simply locks the cover member when the opening is closed.

21. The recording tape cartridge of claim 20, wherein the lock mechanism is formed from a bent portion which is formed by one end of the first inclined portion being bent.

22. The recording tape cartridge of claim 21, further comprising an urging member urging the cover member in a direction in which the opening is closed.

23. The recording tape cartridge of claim 22, wherein the urging member is a torsion spring.

* * * * *